(12) United States Patent
Nakayama

(10) Patent No.: US 10,146,003 B2
(45) Date of Patent: Dec. 4, 2018

(54) PLANAR LIGHTING DEVICE

(71) Applicant: MINEBEA CO., LTD., Kitasaku-gun, Nagano (JP)

(72) Inventor: Daisuke Nakayama, Fukuroi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 70 days.

(21) Appl. No.: 15/014,153

(22) Filed: Feb. 3, 2016

(65) Prior Publication Data

US 2016/0231492 A1     Aug. 11, 2016

(30) Foreign Application Priority Data

Feb. 5, 2015  (JP) ................................. 2015-021349

(51) Int. Cl.
*F21V 8/00* (2006.01)

(52) U.S. Cl.
CPC ......... *G02B 6/0061* (2013.01); *G02B 6/0036* (2013.01)

(58) Field of Classification Search
CPC .. G02B 6/0033; G02B 6/0035; G02B 6/0036; G02B 6/0043; G02B 6/0058
See application file for complete search history.

(56) References Cited

U.S. PATENT DOCUMENTS

| | | | | |
|---|---|---|---|---|
| 2003/0030764 A1* | 2/2003 | Lee | ...................... | G02B 6/0036 349/65 |
| 2005/0270802 A1* | 12/2005 | Hsu | ................... | G02F 1/133615 362/626 |
| 2006/0291248 A1 | 12/2006 | Yu | | |
| 2008/0205079 A1* | 8/2008 | Egawa | ................. | G02B 6/0016 362/612 |
| 2009/0046220 A1* | 2/2009 | Tsuchiya | .............. | G02B 6/0036 349/65 |
| 2009/0147353 A1* | 6/2009 | Yang | .................... | G02B 6/0036 359/350 |
| 2010/0097825 A1* | 4/2010 | Weng | .................. | G02B 6/0036 362/625 |

(Continued)

FOREIGN PATENT DOCUMENTS

| | | |
|---|---|---|
| CN | 1880978 A | 12/2006 |
| CN | 205480504 U | 8/2016 |

(Continued)

OTHER PUBLICATIONS

Apr. 26, 2017 Office Action issued in Japanese Patent Application No. 2015-021349.

(Continued)

*Primary Examiner* — Alexander K Garlen
(74) *Attorney, Agent, or Firm* — Oliff PLC

(57) ABSTRACT

A planar lighting device includes: a light source; a light-guiding plate including: a light incident end face on which the light source is arranged; a facing end face facing the light incident end face; and a pair of principal faces that couple the light incident end face and the facing end face with each other; and plurality of optical elements that are provided on at least one of the pair of the principal faces and include a plurality of first elements each having an unevenly shaped part in which recesses and/or projections are repeatedly arranged, the plurality of first elements being arranged intermittently from the light incident end face toward the facing end face.

9 Claims, 11 Drawing Sheets

(56) References Cited

U.S. PATENT DOCUMENTS

| | | | | |
|---|---|---|---|---|
| 2010/0288614 A1* | 11/2010 | Ender | ................. | G02B 6/0065 |
| | | | | 200/5 A |
| 2011/0228556 A1* | 9/2011 | Wang | ................... | G02B 6/0036 |
| | | | | 362/606 |
| 2013/0021557 A1 | 1/2013 | Momose et al. | | |
| 2016/0231492 A1 | 8/2016 | Nakayama | | |

FOREIGN PATENT DOCUMENTS

| | | |
|---|---|---|
| JP | H04-162002 A | 6/1992 |
| JP | 2003-109418 A | 4/2003 |
| JP | 2009-129792 A | 6/2009 |
| JP | 2010-062135 A | 3/2010 |
| JP | 2012-079559 A | 4/2012 |
| JP | 2013-026019 A | 2/2013 |
| KR | 100805796 B1 | 2/2008 |
| TW | 201133083 A | 10/2011 |
| WO | 2009-051452 A2 | 4/2009 |
| WO | 2012/042938 A1 | 4/2012 |

OTHER PUBLICATIONS

Sep. 3, 2018 Office Action issued in Chinese Patent Application No. 201610064723.7.

\* cited by examiner

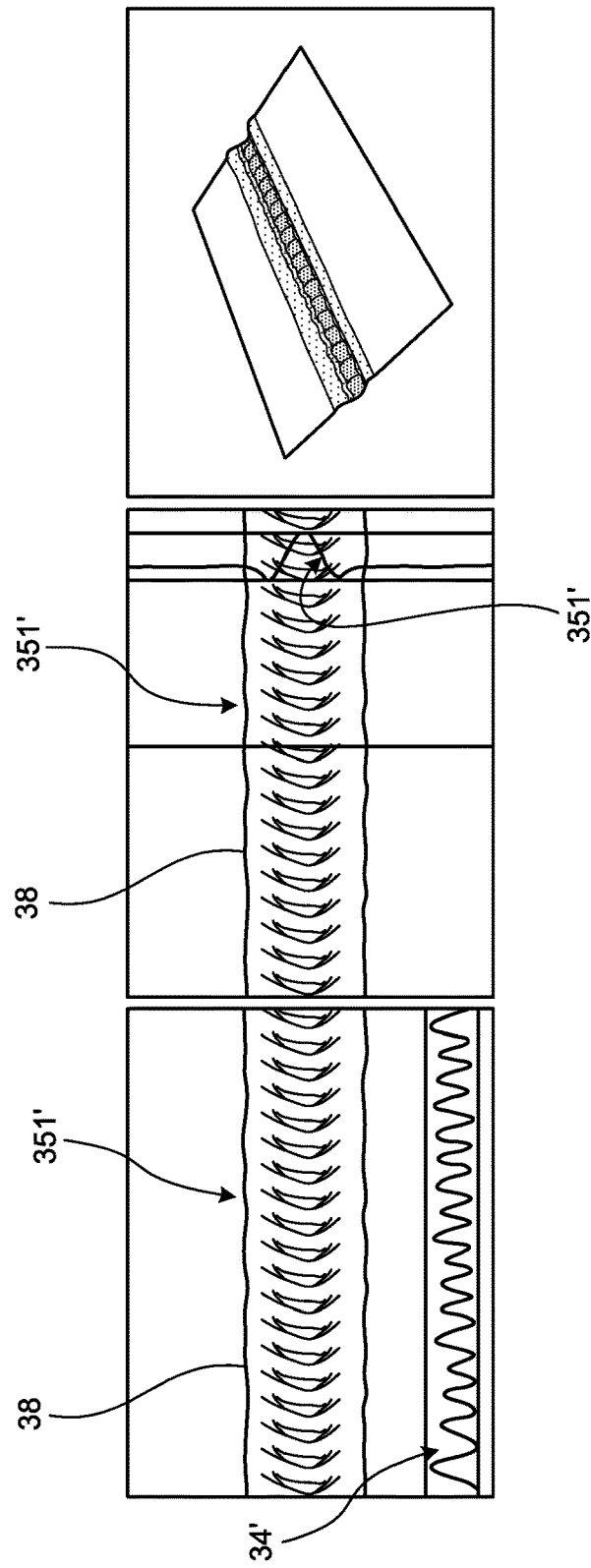

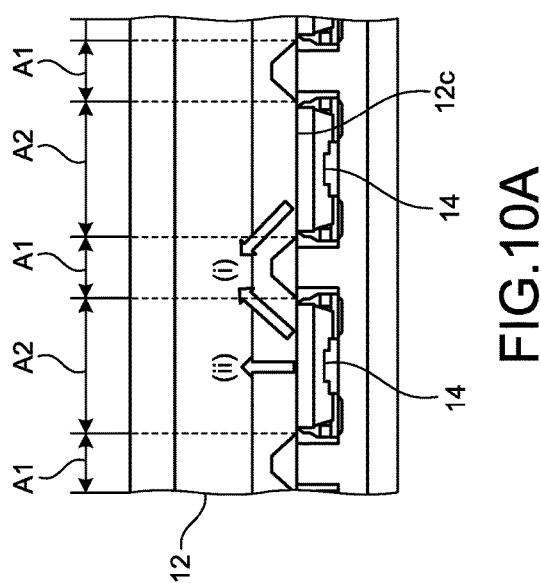
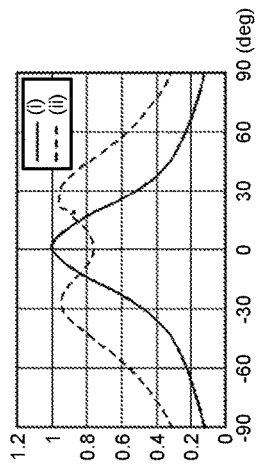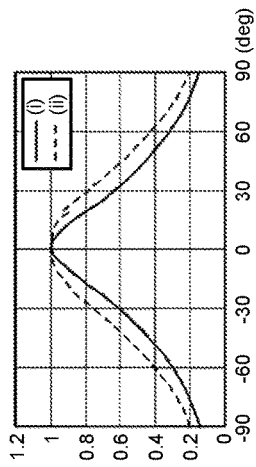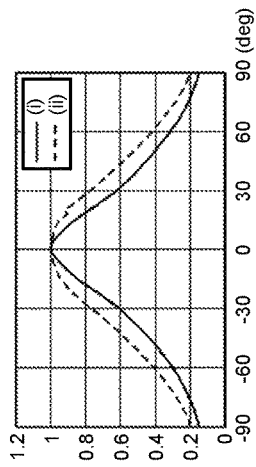
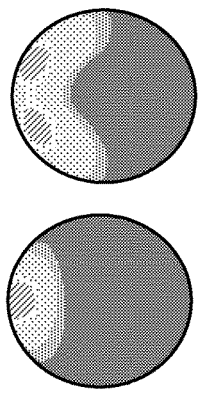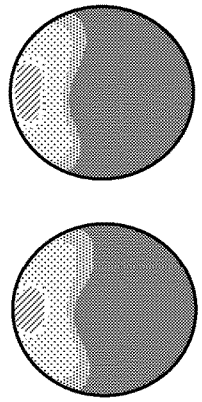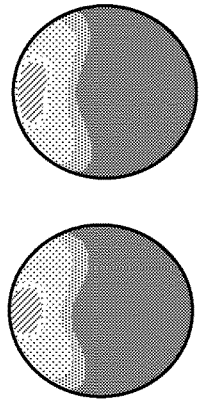

PLANAR LIGHTING DEVICE

CROSS-REFERENCE TO RELATED APPLICATION

The present application claims priority to and incorporates by reference the entire contents of Japanese Patent Application No. 2015-021349 filed in Japan on Feb. 5, 2015.

BACKGROUND OF THE DISCLOSURE

1. Field of the Disclosure

The present disclosure relates to a planar lighting device used as a lighting unit for liquid crystal display devices or the like.

2. Description of the Related Art

Today liquid crystal display devices are commonly used as display devices of electronic devices such as personal computers and cellular phones. Since liquid crystal is not a spontaneous light emitting display element, for example, a transmission type liquid crystal display device requires a lighting unit for irradiating its liquid crystal panel, and a semi-transmission type liquid crystal display device using external light also requires an auxiliary lighting unit for using in a dark place. Planar lighting devices including a light-guiding plate and a light source arranged at the side of the light-guiding plate as principal components are widely used in combination with liquid crystal display devices as such a lighting unit for liquid crystal display devices, because of having the advantage of being easily reduced in thickness. Along with recent growing performance of white light-emitting diodes (LEDs), planar lighting devices using the white LEDs as light sources have also become commonplace for the purpose of further miniaturization, reduction in thickness, and reduced power consumption of planar lighting devices.

A conventional example of such planar lighting devices will be described with reference to FIG. 13. FIG. 13 illustrates the dimensions and positional relation of components for convenience. Although the components are illustrated with gaps therebetween, the components are appropriately arranged so as to be in intimate contact with each other or fixed to each other with double-sided adhesive tape, by fitting, or the like so as to achieve the most suitable optical characteristic in practice. This planar lighting device 10 includes a light-guiding plate 12 with a rectangular shape in a plan view and an LED 14 serving as a point light source arranged facing a light incident end face 12c that is one side end face of the light-guiding plate 12, and the illustrated example includes a housing frame 16 for housing these components. The light-guiding plate 12 includes a facing end face 12d facing the light incident end face 12c and a pair of principal faces 12a and 12b that couple the light incident end face 12c and the facing end face 12d with each other, with one principal face 12a (a front face) as a light exit face. The light-guiding plate 12 is formed by molding a transparent resin material such as an acrylic resin. Examples of the LED 14 include a white LED having a structure in which a blue light-emitting LED chip is sealed with a translucent resin in which yttrium-aluminum-garnet (YAG) fine particles activated by cerium that is a yellow light-emitting fluorescent body are mixed into a hard silicone resin. The housing frame 16 is formed of synthetic resin or metal.

In the illustrated example, an optical sheet 22 is arranged on the light exit face 12a side of the light-guiding plate 12. Furthermore, a reflective sheet 24 is arranged on the back face 12b side as the other principal face of the light-guiding plate 12. A frame-shaped light-shielding sheet 28 is arranged on the light exit face 12a of the light-guiding plate 12 so as to hold the periphery of the optical sheet 22. In the illustrated example, part of an FPC 26 on which the LED 14 is mounted overlaps the light-guiding plate 12 in a plan view, and the overlapped part is caused to adhere to the back face 12b of the light-guiding plate 12 with double-sided adhesive tape 30. A plurality of dome-shaped projections 32 are formed on the back face 12b of the light-guiding plate 12. Furthermore, an uneven structure 34 (a multi-ribbed prism with an arc-sectioned shape, a V-sectioned shape, or the like) linearly extending from the light incident end face 12c toward the facing end face is arranged on the exit face 12a of the light-guiding plate 12 (refer to Japanese Patent Application Laid-open No. 2009-129792, for example).

The dome-shaped projections 32 of the light-guiding plate 12 in FIG. 13 are optical elements functioning as a light exit pattern and cause light incident on the back face 12b of the light-guiding plate 12 out of light incident from the light incident end face 12c and traveling inside the light-guiding plate 12 to be reflected or scattered toward the exit face 12a and to exit from the exit face 12a in a planar manner. The linearly extending uneven structure 34 is an optical element functioning as a light diffusion pattern and diffuses the light incident on the exit face 12a of the light-guiding plate 12 in a direction parallel to the light incident end face 12c and improves the uniformity of illuminating light exiting from the exit face 12a. The linearly extending uneven structure 34 also has a function of forwarding light toward the facing end face 12d while diffusing the light in a direction parallel to the light incident end face 12c so that the light incident from the light incident end face 12c in a plan view of the light-guiding plate 12 will not escape from a pair of side end faces perpendicular to the light incident end face 12c to the outside. By thus providing the optical elements having different shapes and optical functions on the front and back of the light-guiding plate 12, bright illuminating light with the occurrence of brightness unevenness and bright lines reduced can be obtained even with a configuration using the LED 14 as the point light source.

In forming the dome-shaped projections 32 and the linearly extending uneven structure 34 as the optical elements on the principal faces 12a and 12b of the light-guiding plate 12, the optical elements differ in a method of processing. When the light-guiding plate 12 is formed using a mold, for example, as for the dome-shaped projections 32, the mold is irradiated with laser light to form recesses corresponding to the projections. As for the linearly extending uneven structure 34, a corresponding uneven structure is formed on the mold with a cutting tool using a bit or the like. At least two kinds of methods of processing are thus required to be used for the manufacture of a mold for forming one light-guiding plate 12, and consequently, mold processing costs increase, which hinders cost reduction in planar lighting devices. Cutting using a bit in particular tends to take a longer processing time, which promotes an increase in processing costs. The same further holds true for a case of directly forming the dome-shaped projections 32 and the uneven structure 34 on a light-guiding plate (a transparent substrate).

There is a need for a planar lighting device that is excellent in the uniformity of brightness at low cost by providing a light-guiding plate included in the planar lighting device with characteristic optical elements.

SUMMARY OF THE DISCLOSURE

It is an object of the present disclosure to at least partially solve the problems in the conventional technology.

Our planar lighting device includes: a light source; a light-guiding plate including: a light incident end face on which the light source is arranged; a facing end face facing the light incident end face; and a pair of principal faces that couple the light incident end face and the facing end face with each other; and plurality of optical elements that are provided on at least one of the pair of the principal faces and include a plurality of first elements each having an unevenly shaped part in which recesses and/or projections are repeatedly arranged, the plurality of the first elements being arranged intermittently from the light incident end face toward the facing end face.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 1A is a side view; and FIG. 1B is a plan view (a backside view);

FIGS. 6A to 6C illustrate a groove of a mold for molding a first element forming an optical element of the light-guiding plate of the planar lighting device according to the embodiment of the present disclosure: FIG. 6A illustrates a plan view and a longitudinal sectional view (an uneven profile in the central part in the width direction) of the groove; FIG. 6B illustrates a plan view and a lateral sectional view of the groove; and FIG. 6C illustrates a perspective view of the groove illustrated in FIGS. 6A and 6B;

FIG. 7A is a plan view of recesses formed discretely on a molding face of the mold; FIG. 7B is a perspective view of FIG. 7A; and FIG. 7C is a plan view schematically illustrating a streak-shaped groove corresponding to the first element and how adjacent recesses partly overlap with each other during processing in a plan view of the molding face of the mold;

FIG. 8A illustrates an example of performing simple constant-pitch processing by one groove processing process; and FIG. 8B illustrates an example of performing a first groove processing process with a larger feed pitch than that of the example of FIG. 8A and then performing a second groove processing process to form recesses on respective intermediate positions of recesses formed in the first groove processing process;

FIGS. 9A and 9C illustrate an optical path change action of the optical element according to the embodiment of the present disclosure; FIG. 9B illustrates an optical path change action of an optical element having a V-shaped cross section forming a conventional linearly extending uneven structure as a comparative example of FIG. 9A; and FIG. 9D illustrates an optical path change action of a second element formed by arranging adjacent projections discretely as a comparative example of FIG. 9C;

FIGS. 10A to 10J illustrate measurement results of brightness unevenness of the planar lighting device according to the embodiment of the present disclosure: FIG. 10A schematically illustrates a first area and a second area; FIGS. 10B, 10C, and 10D illustrate brightness unevenness of a conventional planar lighting device as a comparative example; FIGS. 10E, 10F, and 10G illustrate brightness unevenness of a planar lighting device using a light-guiding plate including two optical elements including dome-shaped projections and a linearly extending uneven structure as a comparative example; and FIGS. 10H, 10I, and 10J illustrate brightness unevenness of the planar lighting device according to the embodiment of the present disclosure;

DETAILED DESCRIPTION OF THE PREFERRED EMBODIMENTS

Figure 1A:
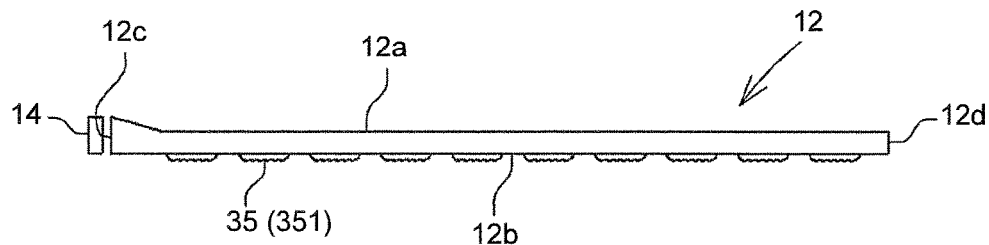
FIGS. 1A and 1B illustrate a light-guiding plate of a planar lighting device according to an embodiment of the present disclosure.

The following describes an embodiment of the present disclosure based on the drawings. The same parts as or corresponding parts to those of the conventional technique will appropriately be attached with the same symbols and a detailed description thereof will be omitted. "Up" and "down" directions in the following description mean the up-and-down direction with the planar lighting device in the present description placed flat. "Front" and "rear" directions mean a front direction of an exiting direction of light from a light-emitting face of a point light source and its opposite direction with the planar lighting device in the present description placed flat. "Left" and "right" directions mean directions perpendicular to the exiting direction of the light from the light-emitting face of the point light source and the up-and-down direction with the planar lighting device in the present description placed flat. "Substantially match" includes matching with a reasonable error permitted in addition to perfect matching.

The planar lighting device according to the embodiment of the present disclosure is the same as the conventional planar lighting device 10 illustrated in FIG. 13 in the entire configuration, and the planar lighting device according to the present embodiment will be described while appropriately considering FIG. 13. The planar lighting device according to the embodiment of the present disclosure includes optical elements 35 described below in place of the dome-shaped projections 32 formed on the back face 12*b* of the light-guiding plate 12 and the linearly extending uneven structure 34 formed on the exit face 12*a* of the conventional planar lighting device 10 illustrated in FIG. 13. As for the other components, those of the planar lighting device 10 illustrated in FIG. 13 can be employed.

Figure 1B:
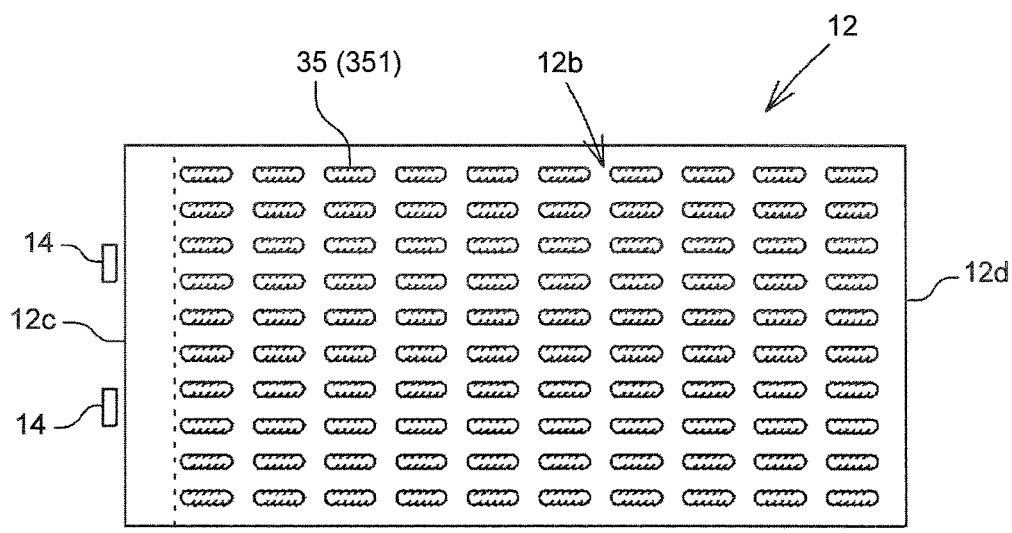

FIGS. 1A and 1B illustrate only the light-guiding plate 12 and the LED 14 in an extracted manner as characteristic parts of the planer lighting device according to the embodiment of the present embodiment. The light-guiding plate 12 includes a plurality of optical elements 35 on at least one of the pair of principal faces 12*a* and 12*b*, that is, on the principal face (back face) 12*b* side facing the exit face 12*a* in the example in FIGS. 1A and 1B. In the example in FIGS. 1A and 1B, the optical elements 35 include a first element 35₁ alone having an unevenly shaped part 36 in which recesses and/or projections are repeatedly arranged as illustrated in FIGS. 9A to 9D. First elements 35₁ are arranged intermittently from the light incident end face 12*c* toward the facing end face 12*d*.

In the example (a first pattern) in FIGS. 1A and 1B, the first elements 35₁ are arranged in a lattice shape in the front-and-rear and left-and-right directions and are arranged in an equally spaced manner in the front-and-rear direction and in an equally spaced manner also in the right and left direction. Furthermore, each of the first elements 35₁ is arranged so as to extend in a direction (the front-and-rear direction) perpendicular to the light incident end face 12*c*. Although the light-guiding plate 12 in the example in FIGS. 1A and 1B is formed with what is called a light incident wedge in a range with a predetermined width near the light incident end face 12*c* so that the thickness of the end at which the light incident end face 12*c* is positioned will be larger than the thickness of a range in which light exits from the exit face 12*a*, the entire pair of facing principal faces 12*a* and 12*b* may appropriately be shaped in the form of flat plates parallel to each other as illustrated in FIG. 13. Also in the examples illustrated in FIG. 2 to FIG. 4 described below, the entire configuration is similar to that of the example in FIGS. 1A and 1B.

Figure 7A:
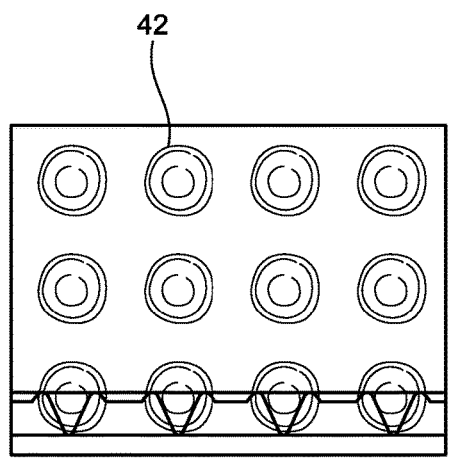
FIGS. 7A to 7C are explanatory diagram of a method for manufacturing the light-guiding plate according to the embodiment of the present disclosure.
Figure 7B:
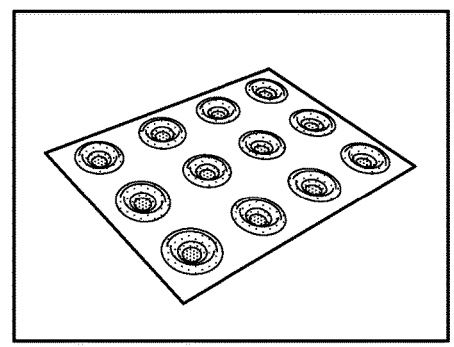
Figure 7C:
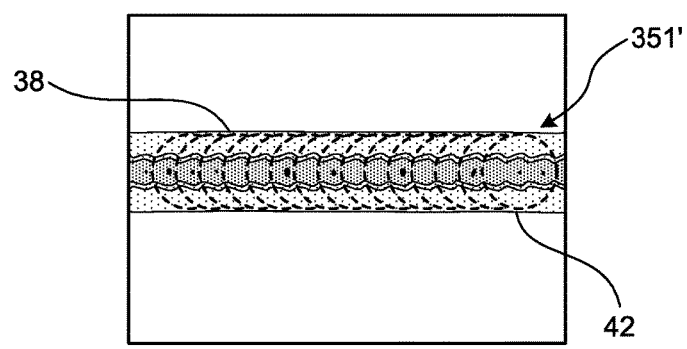
Figure 9A:
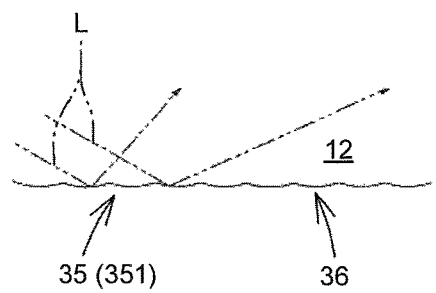
FIGS. 9A to 9D illustrate an effect obtained by the first element of the light-guiding plate according to the embodiment of the present disclosure.
Figure 9B:
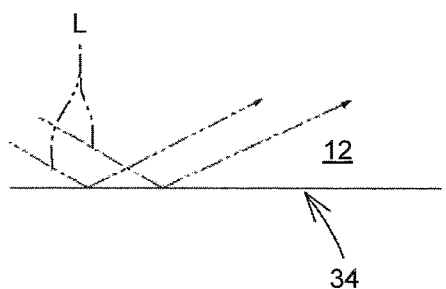
Figure 9C:
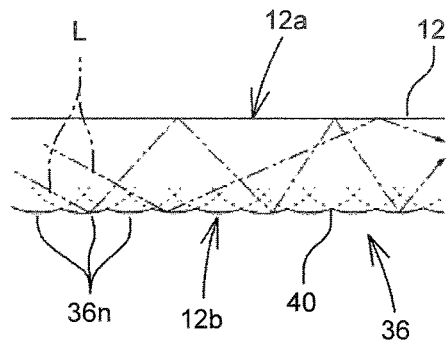

The first elements 35₁ each include the unevenly shaped part 36 as illustrated in FIGS. 9A and 9C. The unevenly shaped part 36 arranges a plurality of adjacent recesses or projections 36*n* so as to partly overlap with each other in a plan view of the principal face 12*b*, is formed as a continuous body, is repeatedly arranged in the longitudinal direction of the first elements 35₁, and is thereby formed as intermittent streak-shaped projections as schematically illustrated in FIGS. 1A and 1B. The projections 36*n* are each shaped in the form of a projected dome obtained by transferring a dome-shaped recess 42 formed on a mold as illustrated in FIGS. 7A and 7B.

Consequently, a cross section along the longitudinal direction of the first elements 35₁ of the unevenly shaped part 36 contains an arc-shaped part obtained by cutting the projection 36*n*. The unevenly shaped part 36 of the first elements 35₁ is formed with a ridgeline 40 (refer to FIG. 9C) extending so as to connect one end side and the other end side of the optical element 34 in the lateral direction in a plan view of the principal face 12*b* of the light-guiding plate 12. When a ridgeline 38 illustrated in FIGS. 6A to 6C and FIG. 7C is formed on the mold, the ridgeline 40 has a shape obtained by transferring the ridgeline 38 of the mold.

The following describes a method for manufacturing the light-guiding plate 12 including the first elements 35₁. For the method of manufacture, generally, recesses and/or projections forming work is performed with a predetermined feed pitch (which is not necessarily required to be constant) so that recesses and/or projections will partly overlap with each other in an area of the light-guiding plate 12 on which the first elements 35₁ are provided to form the first elements 35₁. Furthermore, the embodiment of the present disclosure uses a mold for the manufacture of the light-guiding plate 12, thereby aiming at producing the light-guiding plate 12 including the first elements 35₁ in volume with high precision and at low cost. In a mold manufacturing process, recesses 42 as illustrated in FIGS. 7A and 7B are formed in an area of a molding face of the mold corresponding to the first elements 35₁. In this situation, as illustrated in FIGS. 6A to 6C and FIG. 7C, recesses forming work is performed with a predetermined feed pitch so that the recesses partly will overlap with each other to form grooves 35₁' corresponding to the first elements 35₁. The shape of the molding face of the mold manufactured in the mold manufacturing process is transferred to resin forming the light-guiding plate 12 in a light-guiding plate molding process to manufacture the light-guiding plate 12 including the first elements 35₁.

Figure 8A:
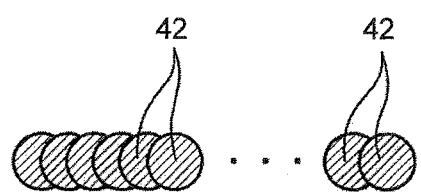
FIGS. 8A and 8B exemplify a technique for forming linear recesses as a whole by irradiating an area on the molding face of the mold corresponding to the optical element with a laser.
Figure 8B:
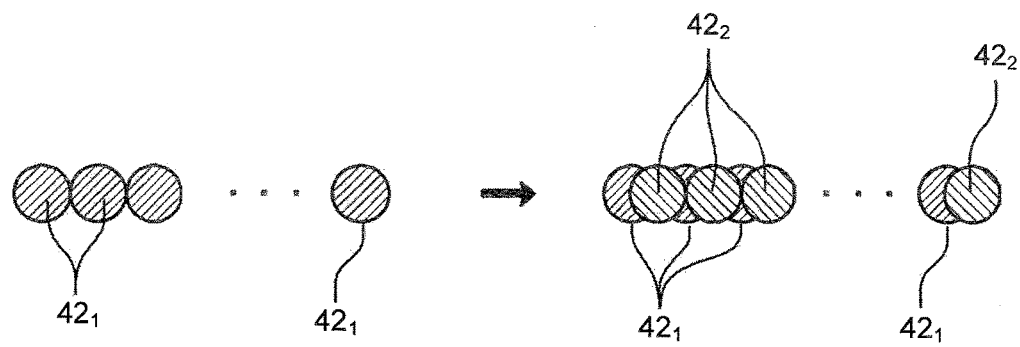

The example illustrated in FIG. 8A as the recesses forming work in the mold manufacturing process forms the recesses 42 by simple constant-pitch processing in one-time groove processing process. The example illustrated in FIG. 8B forms recesses 42₁ by a first groove processing process with a larger feed pitch than that of the example in FIG. 8A and then performs a second groove processing process on respective intermediate positions of the recesses 42₁ formed in the first groove processing process to form recesses 42₂. In the methods of processing in FIGS. 8A and 8B, even if the pitches of the finally formed recesses 42 are matched, the uneven structures of the grooves formed on the mold are different from each other. It is desirable that the method of processing be selected appropriately in consideration of necessary optical characteristics.

In the embodiment of the present disclosure, a laser is used in the groove processing process. A description will be given based on the example illustrated in FIG. 8A; the recesses forming work in the mold manufacturing process forms one recess 42 by the irradiation of laser light and then changes a laser light irradiation position by a predetermined distance (a distance shorter than the dimension of one recess 42 such as width, length, and diameter) to form a next recess 42. During the formation of the recess 42, laser light with a predetermined number of shots is each irradiated to form the recess 42 having a necessary depth. The next recess 42 is formed so as to partly overlap the recess 42 that has been already formed. In this case, the latest-formed recess 42 differs in shape from the recesses 42 formed before, and the latest-formed recess 42 is larger than the recesses 42 formed before (before reaching a steady state). Furthermore, the laser irradiation position is changed in the same direction by the same distance, for example, to repeat the work for forming the next recess 42. With this work, the recesses 42 partly overlap with each other, and unevenly shaped parts the recessed amount and/or projected amount of which are not a constant amount in both lateral and longitudinal directions continue, whereby the groove 351' formed in a linear shape with a predetermined length is formed as a whole.

In this case, the recessed amount of the recess 42 can be adjusted by the number of irradiation shots of the laser light. Specifically, a larger number of irradiation shots of the laser light give a larger depth of the recess 42. When the laser is used in the groove processing process, the shape of the recesses 42 is formed with projected outer rings on the peripheries of the recesses 42 as its sectional shape is indicated in FIGS. 7A and 7B by a line by receiving the influence of heat during laser irradiation or the like. Such complex projections and recesses in which microscopic projections (or recesses) are superimposed that are formed regardless of being intentional each contribute to an effect of the present disclosure described below.

Figure 5:
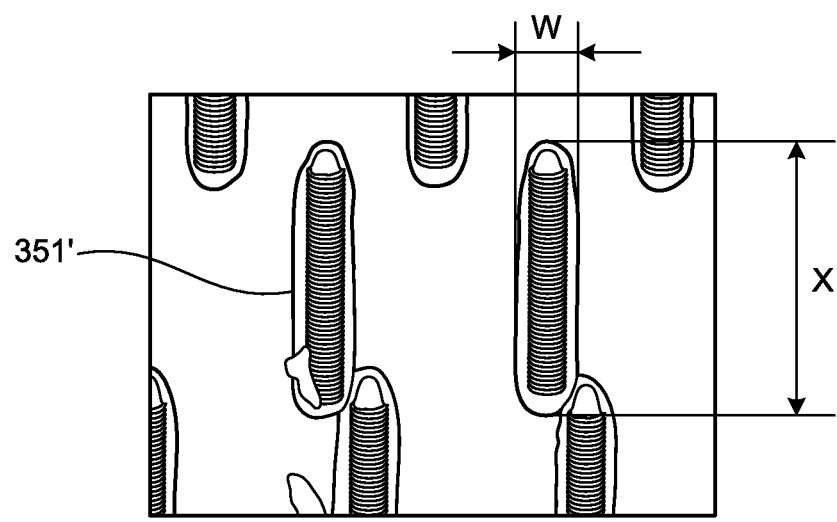
FIG. 5 is a plan view (a backside view) of a partially enlarged application example of the light-guiding plate (a mold for molding the light-guiding plate) of the planar lighting device according to the embodiment of the present disclosure.

As for a specific dimension example of the groove 351' formed by the recesses 42 of the mold for forming the optical element 34, in the example illustrated in FIG. 5 in an enlarged manner, the grooves 351' are each provided in parallel and in a direction separating from the light incident end face 12c of the light-guiding plate 12 linearly with a length X=120 μm, a width (the dimension in the lateral direction) of each groove 351' W=40 μm, a height (depth) of 5 μm, and a pitch of the overlapped projections (recesses) 36n (refer to FIG. 9C) of 3 μm. Although a height difference of the projections and the recesses is preferably larger than zero and 1 μm or less, the present disclosure is not limited to the values.

Figure 2:
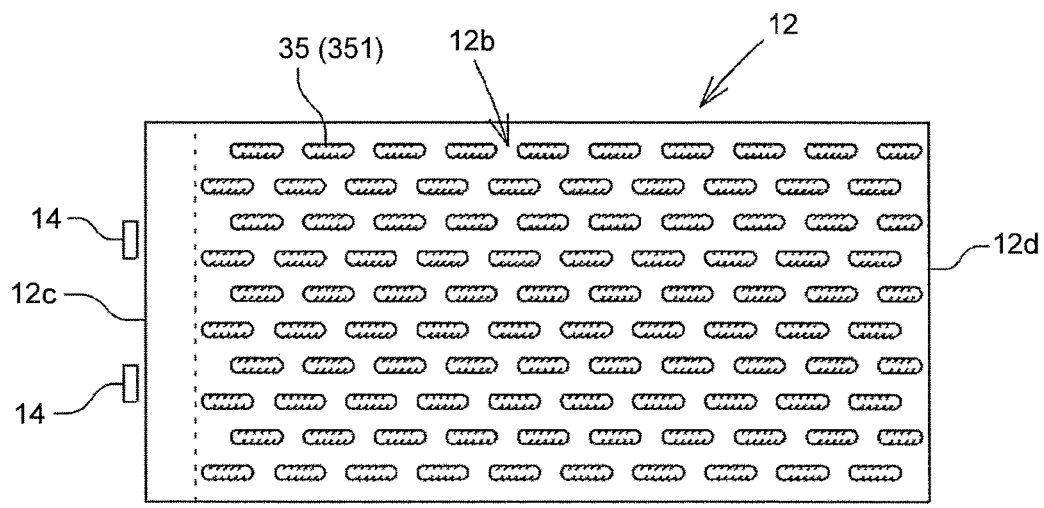
FIG. 2 is a plan view (a backside view) of an application example of the light-guiding plate of the planar lighting device according to the embodiment of the present disclosure.

The application example (a second pattern) illustrated in FIG. 2 differs from the light-guiding plate 12 illustrated in FIGS. 1A and 1B in the arrangement of the first elements 351. Specifically, the first elements 351 are arranged in a staggered shape in the front-and-rear and left-and-right directions not in a lattice shape. The other features are similar to those of the example in FIGS. 1A and 1B. In the application example (a third pattern) illustrated in FIG. 3, the optical elements 35 include not only the first elements 351 but also second elements 352. In the example in FIG. 3, the first elements 351 are provided in a predetermined area near the light incident end face 12c, whereas the second elements 352 are provided in a predetermined area near the facing end face 12d.

Figure 9D:
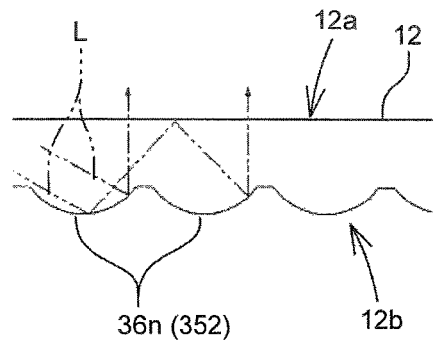

The second elements 352 have a form similar to the conventional dome-shaped projection 32 (refer to FIG. 13) and include independent single bodies of recesses or projections (the projections 36n in the example in FIG. 9D) (that is, discretely arranged adjacent recesses or projections) as illustrated in FIG. 9D. Consequently, the second elements 352 can be manufactured by the same method of processing as that of the first elements 351, and the first elements 351 and the second elements 352 are suitable to be manufactured by the identical manufacturing process (when the optical elements 35 are molded using a mold, the process including a process for manufacturing the mold). Both the first elements 351 and the second elements 352 are arranged in a lattice shape in the front-and-rear and right-and-left directions, in which although their placement spacing is equally spaced in the right-and-left direction, the first elements 351 and the second elements 352 are arranged so that a spacing with another optical element adjacent in the front-and-rear direction, that is, in a direction from the light incident end face 12c toward the facing end face 12d will become smaller from the light incident end face 12c toward the facing end face 12d. Furthermore, the first elements 351 are formed so as to become shorter in length from the light incident end face 12c toward the facing end face 12d. The other features are similar to those of the example in FIGS. 1A and 1B.

Figure 3:
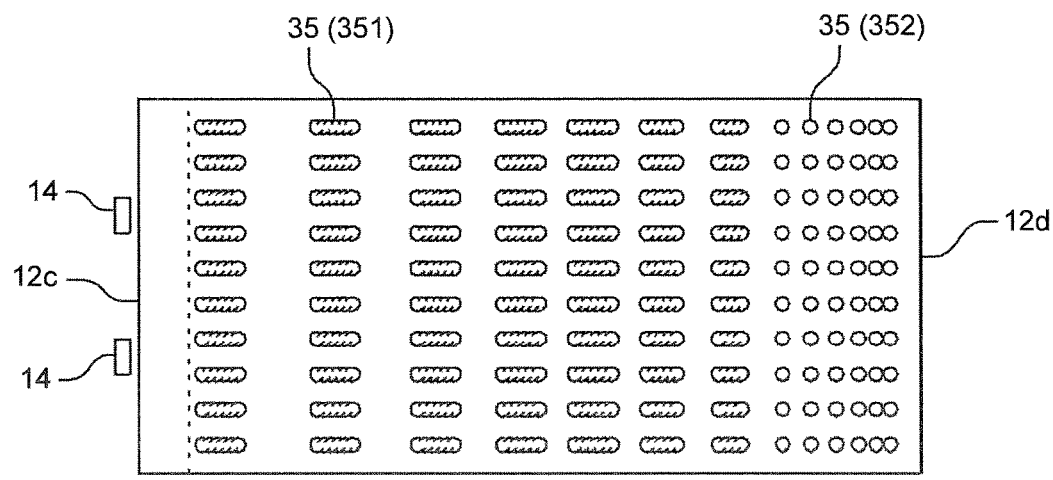
FIG. 3 is a plan view (a backside view) of an application example of the light-guiding plate of the planar lighting device according to the embodiment of the present disclosure.
Figure 4:
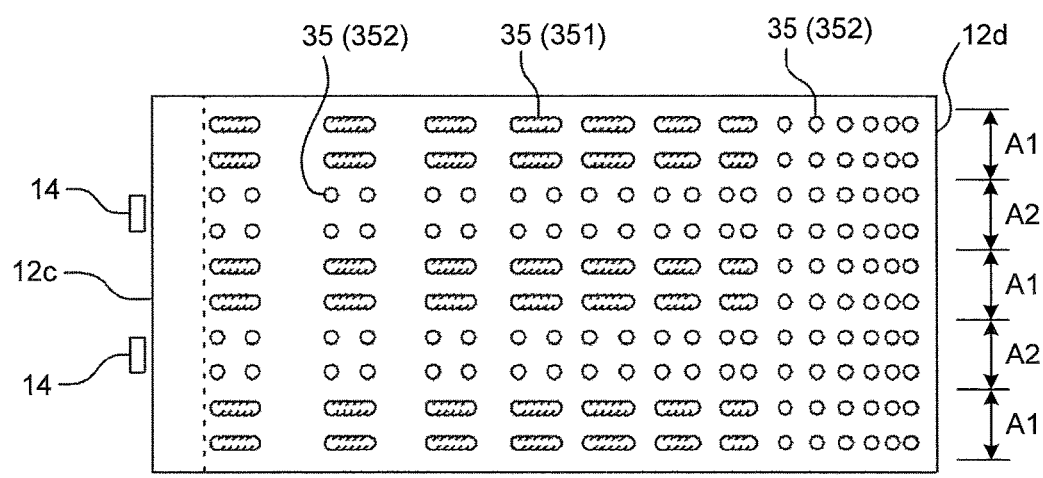
FIG. 4 is a plan view (a backside view) of an application example of the light-guiding plate of the planar lighting device according to the embodiment of the present disclosure.

As a difference from the application example illustrated in FIG. 3, the application example (a fourth pattern) illustrated in FIG. 4, based on each position of the (two in the illustrated example) LEDs 14 arranged spaced apart from each other by a predetermined distance in a direction along the light incident end face of the light-guiding plate, defines an area extending in a band shape from the light incident end face 12c toward the facing end face 12d in front of the LED 14 as a second area A2 and defines an area other than the second area A2 as a first area A1 (for convenience, in FIG. 4, the widths of the first and second areas are indicated by A1 and A2, respectively). The first elements 351 are arranged only in the first area A1, and the second elements 352 are arranged in both the entire second area A2 and a predetermined area near the facing end face 12d of the first area A1 in which the first elements 351 are not arranged. The other features are similar to those of the example in FIGS. 1A and 1B. Only one LED 14 may be used, and the first elements 351 and the second elements 352 may be arranged in the second area A2 and the first area A1 as described above as needed. The first elements 351 may have a longer length X as they separate from the LEDs 14 in a direction parallel to the light incident end face 12c (as they are closer to the center of the adjacent LEDs 14) in at least an area near the light incident end face 12c. Furthermore, as illustrated in FIG. 5, the grooves 351' corresponding to the first elements 351 may be arranged on the mold so that the distance between the first elements 351 adjacent in the front-and-rear direction and/or the right-and-left direction will change randomly, and the arrangement of the first elements 351 obtained by the transfer of the grooves 351' may be at random.

The embodiment of the present disclosure having the above configuration can obtain the following effect. Specifically, as illustrated in FIG. 9A, light L incident from the light incident end face 12c of the light-guiding plate 12 is subjected to optical path change by the first elements 351 having the unevenly shaped parts 36 in the process of traveling inside the light-guiding plate 12, and the light distribution peak direction caused by light diffusion is appropriately adjusted. Furthermore, the recessed amount and/or projected amount of the unevenly shaped part 36 is not constant, and the light traveling inside the light-guiding plate is subjected to optical path change randomly by the first elements 351, whereby the light diffusion action is efficiently exhibited. With this effect, the uniformity of the illuminating light exiting from the exit face 12a of the light-guiding plate 12 increases. By providing the first elements 351, the effect can be obtained by each of the first elements 351.

The first elements 351 are intermittently arranged. In other words, in comparison with the single bodies of recesses or projections with the dome-shaped projections 36n as an example as illustrated in FIG. 9D in shape, the first element 351 is formed as an integral optical element in which the recesses and/or projections continue in a direction they are repeatedly arranged, and the integral optical element is repeatedly arranged. Consequently, the intermittently arranged first elements 351 have both the optical functions including the function as the light exit pattern including the independent recesses or projections alone such as the dome-shaped projections 32 and the function as the light diffusion pattern 34 (refer to FIG. 13) of the linearly extending uneven structure. In the illustrated example, the first elements 351 are provided on the principal face 12b side. The first elements 351 are provided on at least one of the principal faces 12a and 12b, whereby an optical function similar to providing both the optical elements that are different from each other in device shape and optical function such as the dome-shaped projections 32 and the linearly extending uneven structure is exhibited. The first elements 351 are formed by combining the dome-shaped projections 36n and can be formed by one method of processing. In other words, the first elements 351 exhibiting the two functions (that is, the function as the light exit pattern and the function as the light diffusion pattern) can be formed by a single method of processing, whereby a planar lighting device excellent in the uniformity of brightness can be achieved at low cost.

An effect of reducing not only brightness unevenness visually recognized when the exit face 12a of the light-guiding plate 12 is viewed from the front direction but also brightness unevenness visually recognized when the exit face of the light-guiding plate is viewed from an oblique direction is obtained. Furthermore, the recessed amount and/or projected amount of the first elements 351 is not constant in the lateral direction and the longitudinal direction, whereby the optical path of the light L traveling inside the light-guiding plate 12 is changed randomly as illustrated in FIG. 9C, whereby the diffusion action of the light L is efficiently exhibited.

The optical element 35 according to the embodiment includes the unevenly shaped part 36 formed by the dome-shaped projections 36n arranging repeatedly so that the projections 36n adjacent in the longitudinal direction of the first element 351 will partly overlap with each other. This unevenly shaped part 36 has non-constant recessed amount and/or projected amount due to a three-dimensional curved surface contained in the projections 36n. In other words, owing to the projections 36n repeatedly arranging in the longitudinal direction of the first element 351, the sectional shape of the first element 351 is not constant, and the unevenly shaped part 36 is repeated in the longitudinal direction within a range in which increase and decrease in the area of a cross section in a direction perpendicular to the longitudinal direction of the first element 351 is not zero. Alternatively, the first element 351 repeats projections and recesses in the longitudinal direction on its surface layer. With this structure, the first elements 351 do not have a constant shape (do not have monotonous decrease in the area of the cross section) and has high-order anisotropy, whereby the effect is effectively obtained.

In the present embodiment, the cross section along the longitudinal direction of the first element 351 of the unevenly shaped part 36 contained in the first element 351 contains the arc-shaped part obtained by cutting the projection 36n, and the inclination angle of the three-dimensional curved surface contained in the projection 36n is not constant in the longitudinal direction of the first element 351 and changes in accordance with the arc shape. The optical path of the light L traveling inside the light-guiding plate 12 is changed randomly at different positions in the longitudinal direction of the first element 351 and in different directions, whereby the diffusion action of the light L is efficiently exhibited. FIGS. 9A and 9B schematically illustrate an optical path change action of the optical element 35 (the side face as a reflective face of which is a curved surface) according to the present embodiment and an optical path change action of the linearly extending uneven structure 34 (the side face as a reflective face of which is a plane) having the conventional V-shaped cross section by the paths (arrows) of the light L. As is clear from a comparison between the two, the optical path of the light L of the optical element 35 according to the present embodiment illustrated in FIG. 9A is effectively diffused, thereby effectively eliminating various brightness unevenness of the planar lighting device 10. Even if the sectional shape of the linearly extending uneven structure 34 is an arc shape, the optical path change action with respect to the longitudinal direction is as illustrated in FIG. 9B, and superiority of the optical element 35 according to the present embodiment about the elimination of brightness unevenness is not shaken. In the present embodiment, the unevenly shaped part 36 contains the ridgeline 40 extending so as to connect one end side and the other end side of the optical element 35 in the lateral direction in a plan view of the principal face 12b (the cross section in the lateral direction contains the arc-shaped part), and the inclination angle in the lateral direction is not also constant and changes in accordance with the arc shape. Also from this point, the light diffusion action is effectively exhibited. The inclination angle of the three-dimensional curved surface contained in the unevenly shaped part 36 abruptly changes with the ridgeline 40 as a border. For this reason, the optical path of the light L traveling inside the light-guiding plate 12 clearly differs in a direction to be changed with this ridgeline 40 as a border, whereby the diffusion action of the light L is efficiently exhibited.

In the present embodiment, the unevenly shaped part 36 arranges the adjacent projections 36n so as to partly overlap with each other in a plan view of the principal faces 12b and is formed as the continuous body, whereby in comparison with an unevenly shaped part formed by arranging the adjacent projections 36n discretely, the inclination angle of the three-dimensional curved surface contained in the unevenly shaped part is optimized. FIG. 9C illustrates an optical path change action of the first element 351 according to the present embodiment, and FIG. 9D illustrates an optical path change action of the second element 352 formed by arranging the adjacent projections 36n discretely as a comparative example of FIG. 9C. When each of the projections 36n is formed by the dome-shaped three-dimensional curved surface that regularly changes its inclination angle as illustrated, this three-dimensional curved surface increases the inclination angle of the surface (a tangential angle with respect to the principal face) toward the periphery (refer to FIG. 9D).

When the adjacent projections are arranged so as to partly overlap with each other as illustrated in FIG. 9C, the peripheries of the three-dimensional curved surfaces contained in the respective projections are mutually trimmed by the adjacent projections to be arranged linearly. The peripheries, in which the inclination angle is large, are trimmed, whereby the action of changing the optical path of the light L traveling inside the light-guiding plate 12 is relaxed, and the amount of the light L traveling farther from the light incident face increases. Consequently, the amount of light exiting from an area near the facing end face 12d farther from the light incident end face 12c of the light incident face 12a of the light-guiding plate 12 can be increased, and the diffusion action of the light L can efficiently be exhibited. The occurrence of light exiting to the non-effective area is reduced, whereby light utilization efficiency increases (a decrease in the light utilization efficiency is reduced).

As in the examples illustrated in FIG. 3 and FIG. 4, when the optical elements 35 include the second elements 352, the second elements 352 exhibit the function as the light exit pattern. The second elements 352 include single bodies of the recesses or projections 36n, which are also the components of the first elements 351, whereby commonalization of the processing of the second elements 352 and the method for processing the first elements 351 can be achieved. As a matter of course, a processing time required to form one second element 352 is shorter than that of the first element 351. For this reason, the optical elements 35 include not only the first elements 351 but also the second elements 352, whereby a processing time required to form all the optical elements can be reduced in accordance with the ratio of the second elements 352 to all the optical elements.

The first elements 351 are formed as aggregates of the second elements 352, and the method for processing the second elements 352 is also applied to the method for processing the first elements 351 to manufacture the first elements 351 and the second elements 352 by the identical manufacturing process, whereby the processing time required to form all the optical elements can be reduced.

The function as the light diffusion pattern of the first elements 351 is exhibited more effectively as they are closer to the light incident end face 12c, and in the examples in FIG. 3 and FIG. 4, the first elements 351 are provided in the predetermined area near the light incident end face 12c, whereby the function as the light diffusion pattern of the first elements 351 is exhibited more effectively. In other words, the function as the light diffusion pattern of the first elements 351 becomes less effective as they separate from the light incident end face 12c. Consequently, the optical elements in the predetermined area near the facing end face 12d are the second elements 352, which mainly have the function as the light exit pattern and are shorter in processing time than the first elements 351, whereby the processing time required to form all the optical elements 35 can be reduced.

In the examples in FIG. 3 and FIG. 4, the first elements 351 become shorter in length from the light incident end face 12c toward the facing end face 12d, that is, the first elements 351 become closer to the second elements 352 in shape from the light incident end face 12c toward the facing end face 12d. As the first elements 351 become closer to the second elements 352 in shape, the optical function of the first elements 351 and the processing time required to form the first elements 351 also become closer to those of the second elements 352. Consequently, a transition from the effect of the first elements 351 to the effect of the second elements 352 can be obtained gradually or continuously, not stepwise, from the light incident end face 12c toward the facing end face 12d.

The first elements 351 are arranged so that the spacing with another optical element adjacent in the direction from the light incident end face 12c toward the facing end face 12d will become smaller from the light incident end face 12c toward the facing end face 12d, whereby the placement density of the first elements 351 is increased so as to compensate for a decrease in the light amount from the LED 14 in accordance with the distance from the light incident end face 12c. With this arrangement, even at a position far from the light incident end face 12c, the optical function of the first elements 351 can be exhibited. By providing similar arrangement also to the second elements 352, a similar effect can be obtained also in the second elements 352.

Furthermore, in the example in FIG. 4, the first elements 351 are arranged in the first area A1, whereby light distribution in the first area A1 is converted so as to contribute to improvement in brightness unevenness (in particular, a "reversal phenomenon" described below) more effectively by the function as the light diffusion pattern that is the optical function that the first elements 351 have. Furthermore, the first area A1 is an area out of the second area A2 as the band-shaped area having the predetermined width in front of each of the LEDs 14, and in particular, the light distribution of the first area A1 positioned in between the adjacent LEDs 14 tends to exhibit bimodality described below by receiving light from both the two adjacent light sources. This light from both the two adjacent light sources is prompted to exhibit unimodality by the function as the light diffusion patent of the first elements.

FIGS. 10A to 10J compare the light distribution of the planar lighting device including the light-guiding plate 12 formed with the optical elements 35 of the third pattern illustrated in FIG. 3 with a planar lighting device including a light-guiding plate provided with other optical elements. In FIG. 10A, when the exit face 12a of the light-guiding plate 12 is sectioned in terms of the first area A1 and the second area A2 referred to in the example in FIG. 4, light directed to the first area A1 is indicated by the symbol (i), and light directed to the second area A2 is indicated by the symbol (ii). As a first comparative example, FIGS. 10B, 10C, and 10D illustrate light distribution when the dome-shaped projections 32 (refer to FIG. 13) alone are formed on the back face 12b of the light-guiding plate 12. FIG. 10B illustrates visual light distribution of the light (ii) exiting from the second area A2, and FIG. 10C illustrates visual light distribution of the light (i) exiting from the first area A1. FIG. 10D illustrates the light distribution of the light exiting from the respective areas by a graph, in which the horizontal axis shows light distribution angle (in a direction parallel to the light incident end face 12c), and the vertical axis shows brightness.

As is clear from these pieces of data, the first area A1 and the second area A2 widely differ in light distribution. It can be read that while the second area A2 positioned in front of the LED exhibits unimodality in which brightness in the vertical direction of the exit face 12a of the light-guiding plate 12 (refer to FIG. 13) is maximized, the first area A1 exhibits bimodality in which oblique directions are brighter than the vertical direction, because pieces of light (i) reach from the respective LEDs 14. This difference in light distribution brings about brightness unevenness (a phenomenon in which brightness and darkness change by the angle visually recognized, which is also referred to as the "reversal phenomenon" for convenience) visually recognized by the difference in a brightest position (spot) between cases when the light-guiding plate 12 is looked straight (visually recognized from a direction perpendicular to the light incident end face 12c) and when it is looked obliquely (visually recognized from a direction oblique to the light incident end face 12c).

Figure 13:
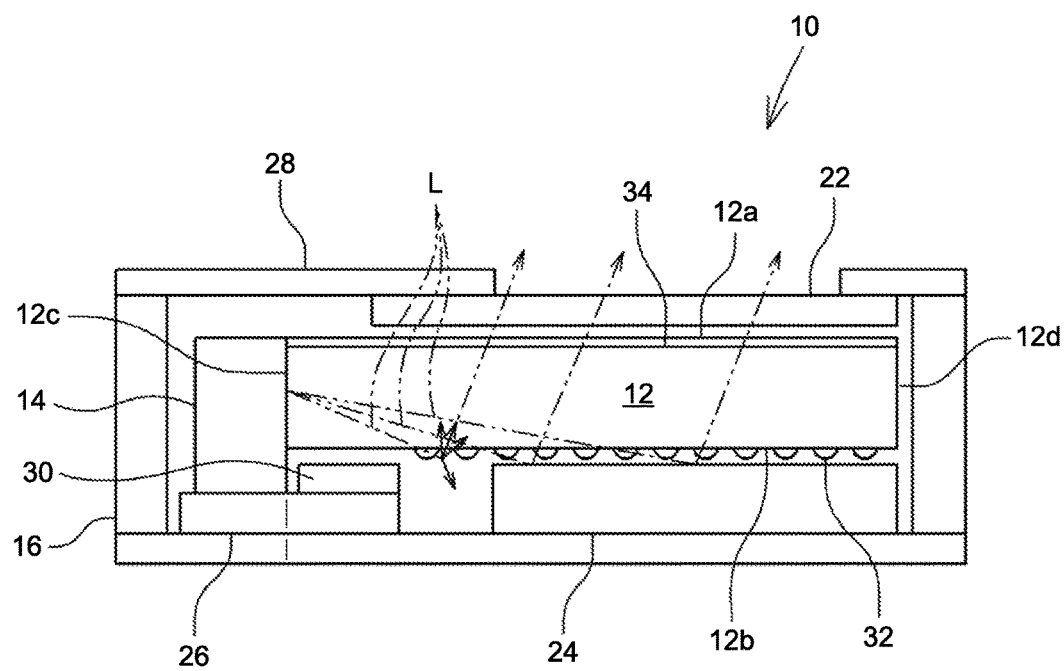
FIG. 13 is a sectional view schematically illustrating a conventional planar lighting device having the same entire configuration as that of the planar lighting device according to the embodiment of the present disclosure.

As a second comparative example, FIGS. 10E, 10F, and 10G illustrate light distribution when the dome-shaped projections 32 are provided on the back face 12b of the light-guiding plate 12, and the linearly extending uneven structure 34 is provided on the exit face 12a of the light-guiding plate 12 as illustrated in FIG. 13. FIGS. 10E, 10F, and 10G illustrate contents similar to those of FIGS. 10B, 10C, and 10G, respectively. It can be read that the first area A1 and the second area A2 substantially match in light distribution and that the brightness unevenness of the first comparative example is eliminated. FIGS. 10H, 10I, and 10J illustrate light distribution according to the embodiment of the present disclosure. FIGS. 10H, 10I, and 10J illustrate contents similar to those of FIGS. 10B, 10C, and 10D, respectively. It can be read that the first area A1 and the second area A2 substantially match in light distribution similarly to the second comparative example and that the brightness unevenness of the first comparative example is eliminated.

Further application examples of the embodiment of the present disclosure effective for obtaining the above effect are as follows. The first elements 351 may be provided across the entire length of the light-guiding plate 12 from the light incident end face 12c to the facing end face 12d and may be provided partly as appropriate. In order to further reduce brightness unevenness, as for not only the first area A1, but also the second area A2, the number and the arrangement may appropriately be adjusted. As also for the second elements 352, it is preferable that the number and the arrangement be appropriately adjusted in consideration of reduction in brightness unevenness.

In consideration of further uniformity of brightness and the like, the first element 351 or the second element 352 may further appropriately be arranged in between adjacent first elements 351. The placement of the first elements 351 and the second elements 352 in the light-guiding plate 12 is not limited to the principal face (back face) 12b side facing the exit face 12a and may be provided on the exit face 12a side and may further be provided on both the pair of principal faces 12a and 12b. Furthermore, the first elements 351 may be provided on the non-effective area of the light-guiding plate 12. In order to reduce moire, for example, the length or pitch of the first elements 351 may be changed randomly. The first elements 351 are not necessarily required to extend linearly and may be somewhat meandering, for example. The shape of the projections 36n (or recesses) contained in the unevenly shaped part 36 is not limited to a dome shape with a perfect circle in a plan view and may be an elliptic dome shape or another shape. The first elements 351 may vary element by element not only in length but also in width, height, and pitch. The same holds true for the second elements 352. Any of the above cases increases design flexibility and can flexibly respond to required brightness distribution and processing time.

Furthermore, in consideration of reduction in moire, for example, the extension direction of the first elements 351 may appropriately be inclined not being a direction accurately perpendicular to the light incident end face 12c of the light-guiding plate 12, and the extension direction may be different for each of the first elements 351. Specifically, the extension direction of the first elements 351 is set as the following application examples, whereby the reversal phenomenon can further be reduced.

Figure 11A:
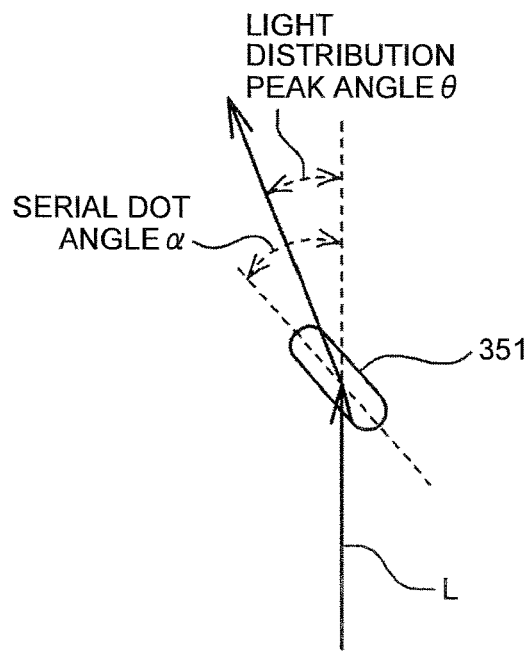
FIG. 11A illustrates an optical element of a light-guiding plate according to a further application example of the planar lighting device according to the embodiment of the present disclosure.
Figure 11B:
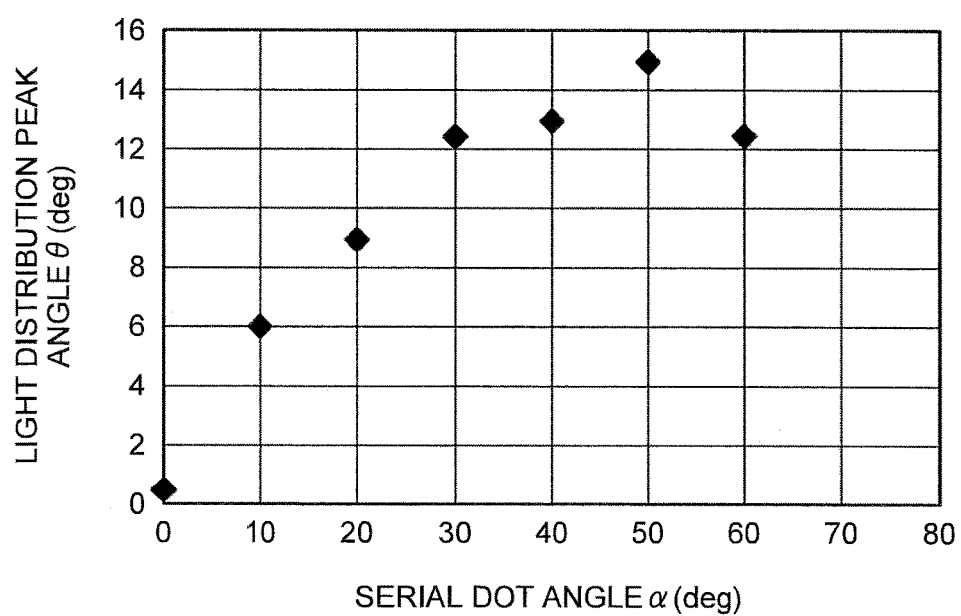
FIG. 11B is a graph illustrating a relation between a serial dot angle and a light distribution peak.

FIG. 11A schematically illustrates a relation between an angle α (a serial dot angle) of a direction in which the first element 351 extends with respect to the direction from the light incident end face 12c toward the facing end face 12d and a light distribution peak angle θ obtained by this first element 351. There is a specific correspondence relation as illustrated by the graph in FIG. 11B between the serial dot angle α of the first element 351 and the light distribution peak angle θ of the light diffused by the first element against light (an incident light beam) L incident on the first element 351. Consequently, by controlling the serial dot angle α of the first element 351, the light distribution peak angle θ can be adjusted.

Using the adjustment function of the light distribution peak angle θ, the serial dot angle α is set so that the direction in which the first element 351 on the optical axis of the LED 14 extends will be arranged so as to be inclined with respect to the optical axis in at least the predetermined area near the light incident end face 12c of the light-guiding plate 12. With this setting, the light L traveling on the optical axis of the LED 14 can be diffused by the optical function of the first element 351, and adjustment of the light distribution peak angle θ by the first element 351 in the predetermined area near the light incident end face 12c can appropriately be performed. Consequently, the first area A1 and the second area A2 (refer to FIG. 4 and FIG. 10A) can be caused to match in light distribution more precisely, and the reversal phenomenon can be reduced more effectively.

Figure 12A:
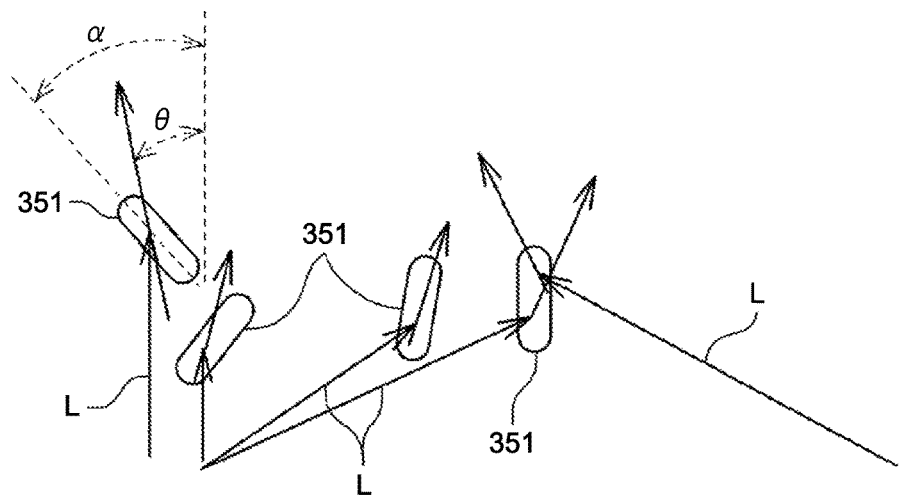
FIG. 12A is a schematic plan view of an embodiment of the application example in FIGS. 11A and 11B.
Figure 12B:
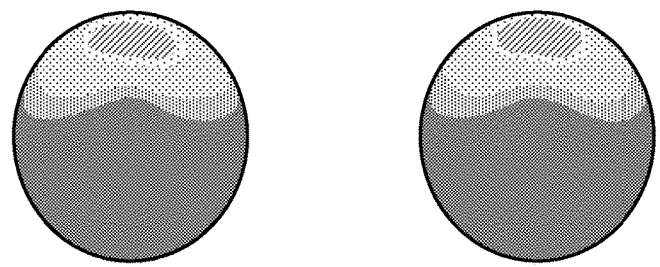
FIG. 12B is a schematic diagram visually illustrating brightness unevenness of the first area and the second area.
Figure 12C:
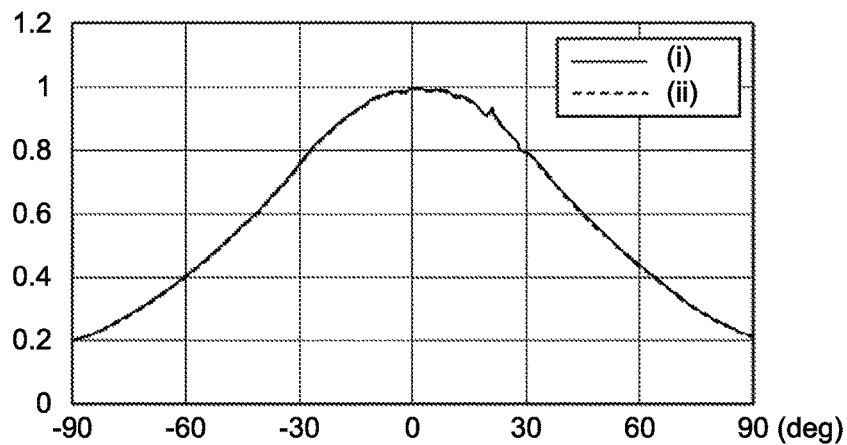
FIG. 12C is a graph illustrating brightness unevenness corresponding to FIG. 12B.

Furthermore, as illustrated in FIG. 12A, each of the first elements 351 may be arranged so that an angle with respect to the direction from the light incident end face 12c toward the facing end face 12d will be different from another adjacent first element 351 in the predetermined area near the light incident end face 12c. The left diagram in FIG. 12B illustrates visual light distribution of the light exiting from the first area A1, and the right diagram in the drawing illustrates visual light distribution of the light exiting from the second area A2. FIG. 12C illustrates light distribution of light exiting from the respective areas by a graph, in which the horizontal axis shows light distribution angle, and the vertical axis shows brightness. It can be read from these pieces of data that the first area A1 (i) and the second area A2 (ii) substantially match in light distribution and that the reversal phenomenon is surely eliminated.

Consequently, as in the application example in FIGS. 12A and 12B, the serial dot angle α is differentiated from another adjacent first element 351, that is, the first elements 351 are set to a direction different from another adjacent first element 351, whereby the function as the light diffusion pattern of each of the first elements 351 is differentiated from the adjacent first element, and light distribution as the entire optical elements 35 can be adjusted to be more appropriate.

The present disclosure is thus configured, whereby the light-guiding plate included in the planar lighting device can be provided with the characteristic optical elements, and a planar lighting device that is excellent in the uniformity of brightness can be provided at low cost.

The planar lighting device may include the first element having the unevenly shaped part in which the recesses and/or projections having three-dimensional shapes are repeatedly arranged in the longitudinal direction of the optical elements on at least one of the pair of the principal faces of the light-guiding plate, whereby light incident from the light incident face of the light-guiding plate is subjected to optical path change by the unevenly shaped part included in the first element in the process of traveling inside the light-guiding plate, and a light distribution peak direction caused by light diffusion is appropriately adjusted. Furthermore, a recessed amount and/or projected amount of the unevenly shaped part is not constant, and the light traveling inside the light-guiding plate is subjected to optical path change randomly by the first element, whereby the light diffusion action is efficiently exhibited. With this effect, the uniformity of illuminating light exiting from an exiting face of the light-guiding plate increases. By providing the first elements, the action can be obtained by each of the first elements. The first elements are intermittently arranged. In other words, when the first element is compared in shape with single bodies of recesses or projections, the first element is formed by repeatedly continuing recesses and/or projections with dome-shaped projections as an example and is formed as an integral optical element. The integral optical element is repeatedly placed. Consequently, the intermittently arranged first elements have both optical functions including the function as the light exit pattern of the optical element including independent recesses or projections alone such as dome-shaped projections and the function as the light diffusion pattern of the linearly extending uneven structure. For this reason, the first elements are provided on at least one of the principal faces, whereby an optical function similar to providing both the optical elements (the dome-shaped projections and the linearly extending uneven structure) that differ from each other in element shape and optical function is exhibited.

The unevenly shaped part of the first elements is not limited to an aspect in which the recesses and/or projections are repeated regularly in the longitudinal direction of the optical element. Also included are non-periodically or irregularly repeated one such as being unequal in the height (depth) or pitch of the recesses and/or projections and a case including projections and recesses of an aspect that does not include clear recesses and projections but includes relative height differences irregularly, for example. Macroscopic projections and recesses superimposed with microscopic recesses or projections are also included. The optical element according to the present disclosure is not limited to an optical element formed of the unevenly shaped part alone and also includes an optical element formed in an intermittent linear shape in which the unevenly shaped part is formed in part in the width direction (the lateral direction) (the central part in the width direction, for example). The first element includes the recesses and/or projections and can be formed using a method for forming the recesses and/or projections. In other words, the optical element that exhibits the two functions (the function as the light exit pattern and the function as the light diffusion pattern) can be formed by one method of processing, whereby a planar lighting device excellent in the uniformity of brightness can be achieved at low cost.

The unevenly shaped part included in the first element may be arranged so that the adjacent recesses or projections will partly overlap with each other in a plan view of the principal faces. By that, in comparison with an optical element including single bodies of recesses and/or projections such as dome-shaped projections, that is, an unevenly shaped part formed by arranging adjacent recesses or projections discretely, an inclination angle of a three-dimensional shape contained in the unevenly shaped part is optimized. In other words, when each recess or projection is formed by a three-dimensional curved surface that regularly changes the inclination angle like a dome shape, this three-dimensional curved surface increases the inclination angle of the surface toward the periphery. When the adjacent recesses or projections are arranged so as to partly overlap with each other, the peripheries of the three-dimensional curved surfaces contained in the respective recesses or projections are mutually trimmed by the adjacent recesses or projections to be aligned linearly. The peripheries, in which the inclination angle is large, are trimmed, whereby the action of changing the optical path of the light traveling inside the light-guiding plate is relaxed, and the amount of light traveling from the light incident face in a direction in which the first elements extend increases. Consequently, the amount of light exiting from an area near the facing end face farther from the light incident face of the principal face of the light-guiding plate is increased, and a light diffusion action is efficiently exhibited. In an aspect including a frame-shaped light-shielding sheet, when the principal faces are viewed in a plan view, a light distribution peak direction by the light diffusion action of the first elements is appropriately adjusted, whereby the amount of light exiting from a non-effective area (what is called a dead area) covered by the light-shielding sheet is reduced, and light utilization efficiency increases.

The optical elements may include the second elements consisting of the independent recesses or projections (that is, as an unevenly shaped part formed by arranging adjacent recesses or projections discretely). The second elements exhibit the function as the light exit pattern. The second elements include single bodies of the recesses or projections, which are also the components of the first elements, whereby commonalization of a method for processing the second elements and a method for processing the first elements can be achieved. As a matter of course, a processing time required to form one second element is shorter than that of the first element. For this reason, the optical elements include the second elements not only the first elements, whereby a processing time required to form all the optical elements can be reduced in accordance with the ratio of the second elements to all the optical elements.

The second elements may include single bodies of the recesses and projections, which are also the components of the first elements. In other words, the first elements are formed as aggregates of the second elements, and the method for processing the second elements is also applied to the method for processing the first elements, and the first elements and the second elements are manufactured by an identical manufacturing process (when the first elements and the second elements are formed using a mold, the process including a process for manufacturing the mold), whereby the processing time required to form all the optical elements can be reduced.

When, based on each position of the light sources arranged spaced apart from each other by a predetermined spacing in a direction along the light incident end face of the light-guiding plate, an area extending in a band shape from the light incident end face toward the facing end face in front of each of the light sources is defined as a second area, and an area other than the second area is defined as a first area, the first elements may be arranged in the first area, and the second elements may be arranged only in the second area or both the first and second areas. In particular, the first elements are arranged in the first area, whereby light distribution in the first area is converted so as to contribute to improvement in brightness unevenness (in particular, a "reversal phenomenon" described below) by the function as the light diffusion pattern that is the optical function that the first elements have. Furthermore, the first area is an area out of the second area as the band-shaped area having the predetermined width in front of each of the light sources, and in particular, the light distribution of the first area positioned in between the adjacent light sources tends to exhibit bimodality described below by receiving light from both the two adjacent light sources. This light from both the two adjacent light sources is prompted to exhibit unimodality by the function as the light diffusion pattern of the first elements.

The function as the light diffusion pattern of the first elements is exhibited more effectively as they are closer to the light incident end face. For this reason, the planar lighting device according to the present disclosure may provide the first elements in the predetermined area near the light incident end face, whereby the function as the light diffusion pattern of the first elements is exhibited more effectively. In other words, the function as the light diffusion pattern of the first elements becomes less effective as they separate from the light incident end face. Consequently, the optical elements in the predetermined area near the facing end face are the second elements, whereby the processing time required to form all the optical elements is reduced. The "predetermined area near the light incident end face" is an area suitable for exhibiting the predetermined action by the first elements and is appropriately derived from the entire components of planar lighting device such as the light-guiding plate and the point light source.

The first elements may become shorter in length from the light incident end face toward the facing end face, that is, the first elements may become closer to the second elements in shape from the light incident end face toward the facing end face. As the first elements become closer to the second elements in shape, the optical function of the first elements and the processing time required to form the first elements also become closer to those of the second elements. Consequently, the above-described effect can be obtained gradually, not stepwise, from the light incident end face toward the facing end face.

The first elements may be arranged so that the spacing with another optical element adjacent in a direction from the light incident end face toward the facing end face will become smaller from the light incident end face toward the facing end face, whereby the placement density of the first elements is increased so as to compensate for a decrease in the light amount from the light source in accordance with the distance from the light incident end face. As the distance from the light incident end face becomes farther, the optical function of the first elements is exhibited. By appropriately providing similar arrangement also to the second elements, a similar action can be obtained also in the second elements.

The angle of the first element in the predetermined area near the light incident end face of the light-guiding plate with respect to the direction from the light incident end face toward the facing end face may be differentiated from another adjacent first element, that is, the first elements may be arranged in a direction different from another adjacent first element, whereby the function as the light diffusion pattern of each of the first elements is differentiated from the adjacent first element, and light distribution as the entire optical elements can be adjusted to be more appropriate. There is a correlation between the angle of the first element with respect to the direction from the light incident end face toward the facing end face and a light distribution peak angle (an angle between the traveling direction of the most intense light out of the diffused light and the longitudinal direction of the first element) of light diffused by the first element against light from the light source. Consequently, the first elements may be arranged as in the above, whereby adjustment of the light distribution peak angle by the first elements in the predetermined area near the light incident end face is performed for each of the first elements, whereby light distribution in the area in which the first elements are arranged is appropriately adjusted.

The direction in which the first element on the optical axis of the light source extends may be arranged so as to be inclined with respect to the optical axis, whereby light traveling on the optical axis of the light source is diffused by the optical function of the first element, and adjustment of the light distribution peak angle by the first element in the predetermined area near the light incident end face is appropriately performed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A planar lighting device comprising:
a plurality of light sources;
a light-guiding plate including:
a light incident end face on which the light source is arranged;
a facing end face facing the light incident end face; and
a pair of principal faces that couple the light incident end face and the facing end face with each other; and
a plurality of optical elements that are provided on at least one of the pair of the principal faces and include a plurality of first elements each having an unevenly shaped part in which at least one of recesses and projections are repeatedly arranged, the plurality of the first elements being arranged intermittently from the light incident end face toward the facing end face, wherein
the optical elements include second elements consisting of independent recesses or projections,
the light sources are arranged spaced apart from each other by a predetermined spacing in a direction along the light incident end face of the light-guiding plate,
the second elements are arranged in at least a second area extending in a band shape with a predetermined width from the light incident end face toward the facing end face in front of the light sources, and
the first elements are arranged in a first area, the first area being an area other than the second area.

2. The planar lighting device according to claim 1, wherein the unevenly shaped part is arranged so that adjacent recesses or projections partly overlap with each other in a plan view of the principal faces.

3. The planar lighting device according to claim 1, wherein the first elements and the second elements are manufactured by an identical manufacturing process.

4. The planar lighting device according to claim 1, wherein
the first elements are arranged in a predetermined area near the light incident end face, and
the second elements are arranged in a predetermined area near the facing end face.

5. The planar lighting device according to claim 1, wherein
a length of the first elements becomes shorter from the light incident end face toward the facing end face.

6. The planar lighting device according to claim 1, wherein
the first elements are arranged so that a spacing with another optical element adjacent in a direction from the light incident end face toward the facing end face becomes smaller from the light incident end face toward the facing end face.

7. The planar lighting device according to claim 1, wherein each of the first elements is arranged so that an angle with respect to the direction from the light incident end face toward the facing end face is different from another adjacent first element in a predetermined area near the light incident end face.

8. The planar lighting device according to claim 7, wherein a direction in which each of the first elements on an optical axis of at least one light source of the plurality of the light sources extends is arranged so as to be inclined with respect to the optical axis in the predetermined area near the light incident end face.

9. A planar lighting device comprising:
a light source;
a light-guiding plate including:
a light incident end face on which the light source is arranged;
a facing end face facing the light incident end face; and a pair of principal faces that couple the light incident end face and the facing end face with each other; and
a plurality of optical elements that are provided on at least one of the pair of the principal faces, and that include a plurality of first elements each having an unevenly shaped part in which at least one of recesses and projections are repeatedly arranged and a plurality of second elements each of which is a recess or a projection whose form is same as each of the recesses or the projections included in each of the first elements, the plurality of the first elements being arranged intermittently from the light incident end face toward the facing end face and the plurality of the second elements being arranged from the light incident end face toward the facing end face.

* * * * *